H. W. SPILLER.
CARBURETER FOR INTERNAL COMBUSTION ENGINES.
APPLICATION FILED DEC. 18, 1917.

1,334,411.

Patented Mar. 23, 1920.
2 SHEETS—SHEET 1.

UNITED STATES PATENT OFFICE.

HERBERT WILLIAM SPILLER, OF HAMPSTEAD, LONDON, ENGLAND.

CARBURETER FOR INTERNAL-COMBUSTION ENGINES.

1,334,411. Specification of Letters Patent. Patented Mar. 23, 1920.

Application filed December 18, 1917. Serial No. 207,761.

*To all whom it may concern:*

Be it known that I, HERBERT WILLIAM SPILLER, a subject of the King of England, residing in Hampstead, London, N. W., England, have invented certain new and useful Improvements in Carbureters for Internal-Combustion Engines, of which the following is a specification.

This invention is for improvements in or relating to carbureters for internal combustion engines and relates to the type of carbureter wherein an additional suction conduit is provided having one end in communication with the induction conduit and the other end with the fuel supply system. Heretofore the induction conduit end of this additional suction conduit has been fixed relatively to the fuel jet.

A primary object of this invention is to provide a simplified construction of carbureter of the kind referred to comprising an additional suction conduit which is of a very simple form and so arranged that it and the induction conduit can be readily adjusted in position one relatively to the other.

According to this invention, there is combined with an induction conduit, means for admitting fuel at a point within said conduit between the exterior end thereof and the engine, and an additional suction conduit constituted by a simple tube open only at its two ends and having one end in communication with the fuel-supply system and the other in operative communication with the effective air-admission end of the induction conduit, which said induction conduit and said suction conduit are arranged to permit of movement of the one relatively to the other for adjusting the extent to which the effective air-admission end of the induction conduit is entered by the end of the additional suction conduit.

Preferably the said end is mounted so as to be movable to any desired position between the point of fuel admission and a point outside the air admission end of the induction conduit.

The term "effective air admission end" will be understood to include any portion of the air inlet conduit on the inlet side of the point of fuel admission and also the area which lies just without the end of the induction conduit and whereof the pressure is lowered by the suction of the engine.

In the accompanying drawings:—

The same letters indicate the same parts throughout the drawings.

Figure 1:
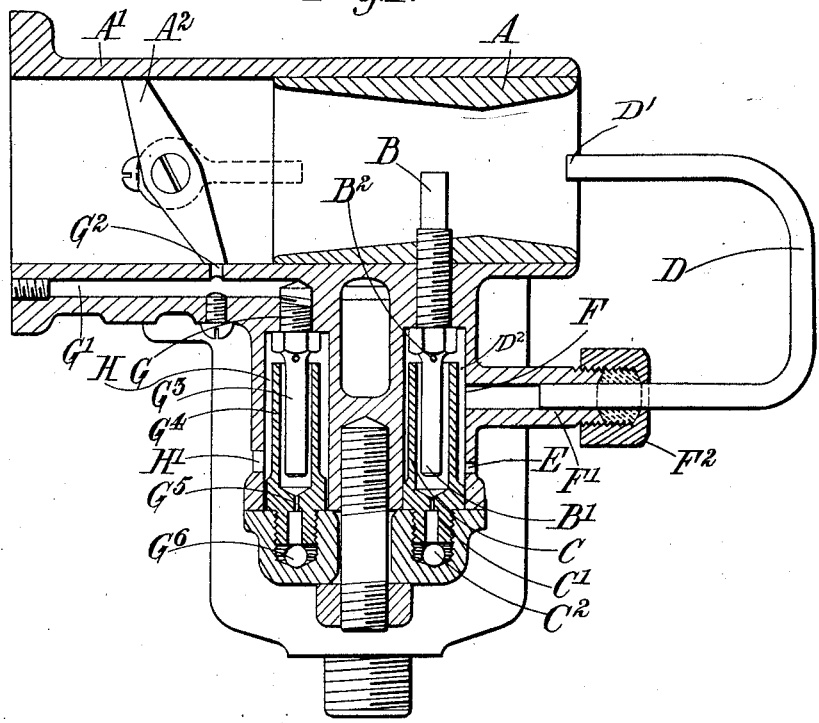
Figure 1 is a central vertical section through the choke tube and fuel jet with attached parts of a carbureter constructed according to one method of carrying out this invention.

Referring to Fig. 1, the choke-tube A of the carbureter is of venturi shape and the fuel-jet B is situated on the engine side of the narrowest part of the tube. The induction conduit $A^1$ is controlled by a throttle-valve $A^2$ as is usual, situated between the engine and the jet B.

The jet has a depending end $B^1$ which lies within a well C. The bottom of the well has a calibrated orifice $C^1$ whereby fuel is admitted from a conduit $C^2$ which communicates with the float-chamber. The additional suction-conduit D communicates with the choke-tube A at $D^1$ at a point which is situated between the fuel-jet and the effective air-inlet to the choke-tube and lies on the air-inlet side of the narrowest portion of the tube. The conduit D communicates with the passage F by means of a telescopic joint in the bracket $F^1$, a stuffing-box $F^2$ being employed to make a tight joint and to hold the conduit D with sufficient rigidity. The passage F opens into the well C where it communicates with an annular space $D^2$ surrounding the well. A drainage orifice E is provided at the bottom of the annular space $D^2$, which orifice is open to the atmosphere.

The carbureter is also provided with a pilot-jet G which communicates with the induction-conduit by a passage $G^1$ and port $G^2$ at a point which is covered by the throttle-valve $A^2$ when this is closed. This pilot-jet is utilized in the same manner as existing pilot-jets but is made of the same form as the jet B, $B^1$, that is to say, it has a depending portion $G^3$ which dips into a well $G^4$ having a calibrated orifice $G^5$ and supplied with fuel by a conduit G⁶ from the float-feed chamber. The well is surrounded by an annular chamber or space H which communicates with the atmosphere at H¹.

The depending portion B¹ of the jet B is provided with a lateral orifice B² and the depending portion G³ of the jet G has a similar lateral orifice.

The operation of this carbureter is as follows:—

When the engine is stationary or is running on the pilot-jet G, the well C will become partially filled with fuel, the height to which this rises being regulated by the level at which it is set relatively to the float-feed chamber. When starting up, therefore, there is a liberal supply of fuel which is readily drawn up through the jet B, but as soon as this is exhausted the fuel has to be sucked up through the orifice C¹ whence it is carried direct into the bottom of the pendent portion B¹ of the jet and thence escapes from the top of the jet, being mingled with air which enters by the lateral orifice B². It will be appreciated that the additional suction-conduit D has a considerable modifying effect upon the lifting power of the suction operating on the jet B as the depression in the choke-tube is always less at the point where the end D¹ of the conduit D is situated than it is at the point where the jet B is situated. It results, therefore, that the suction through the conduit D has a retarding effect upon the supply of fuel, as the tube D causes a greater or less degree of depression to occur in the space D² according to the difference of pressure existing between the top of the fuel-jet and the conduit end D¹. It is found that with an additional suction-conduit arranged in this manner the over-supply of fuel at high speeds is completely prevented. It is found that the conduit-end D¹ in many cases, for general running, needs to be about five-eighths of an inch away from the jet B, but to obtain the best results this distance requires to be varied for different engines. The conduit D is therefore made adjustable by sliding in the bracket F¹ so that the position of its end D¹ can be adjusted for the purpose of obtaining the best results, and in some instances it may need to be carried so far out as to lie outside the actual air-inlet though still within the effective air-inlet, that is to say, it is still in such a position as to be acted on by the inflowing air current.

The drain-hole E is only provided to dispose of any petrol which might by accident rise above the well C and flow into the annular space around the same.

The pilot-jet works in a similar manner to the jet B, but no additional suction-conduit such as D is provided therefor.

From the above description it will be seen that this carbureter affords the advantage of one in which the fuel is supplied through a limiting orifice such as C¹ or G⁵, together with those obtained by the use of the additional suction-conduit D.

Figure 2:
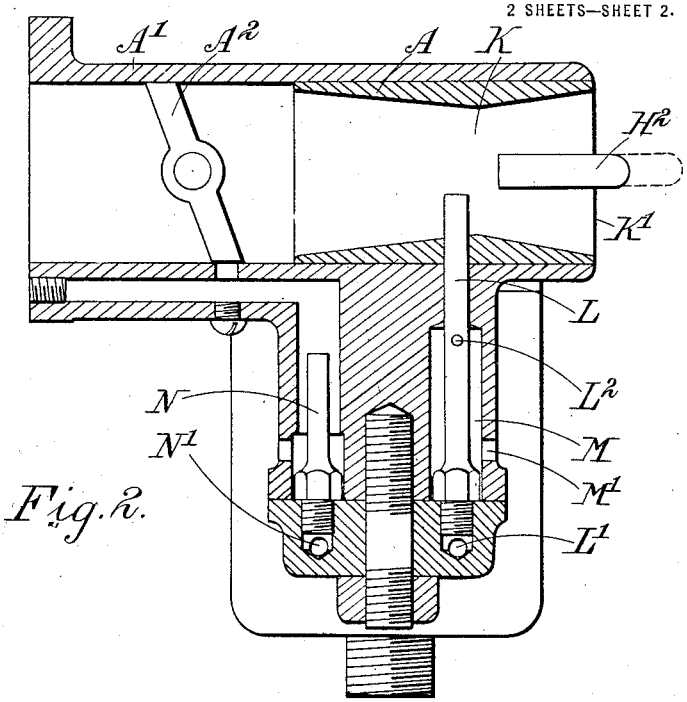
Fig. 2 is a central vertical section through the choke-tube and fuel-jet with attached parts of a carbureter constructed according to another method of carrying out this invention.
Figure 3:
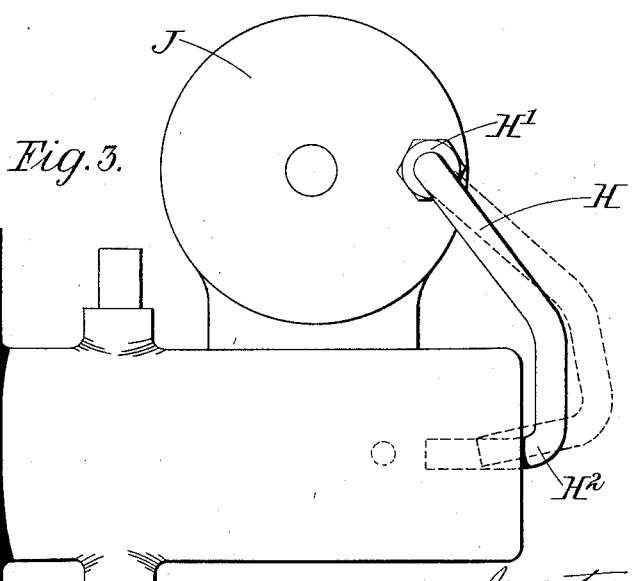
Fig. 3 is a plan of the carbureter shown in Fig. 2.

In Figs. 2 and 3, the additional suction-conduit is shown as connected to the top of the float-feed chamber which otherwise has no communication with the external atmosphere. It thus communicates with the fuel-system at a point whence the fuel passes to the jet instead of communicating with the system at a point which the fuel passes such as the space D² of Fig. 1. The additional suction-conduit thus acts as a counter-suction conduit H, communicates with the float-feed chamber J at H¹ and is pivoted to swing therein about a vertical axis. The free end of the conduit is bent around at H² to enter the choke-tube K. The extreme end of the tube lies at a point between the fuel-jet L and the air-inlet K¹ of the choke-tube so that the depression existing at the jet L will be lower than at the free end of the outlet H.

The fuel is admitted by a passage L¹ from the float-feed chamber to the bottom of the jet L and when the jet is not under suction it rises to a level somewhere below the lateral orifice L² in the jet. The lower part of the jet lies in a chamber M with which the orifice L² is in free communication, and the chamber has an orifice M¹ in the side of it which puts it into free communication with the atmosphere. A pilot-jet N is also provided and is fed from the float-feed chamber up a passage N¹.

The operation of this carbureter is as follows:—

Depression in the choke-tube K results in suction on the jet L which draws up the fuel through the jet, mingled with air entering at the orifices M¹ L². The effective suction of the depression existing is, however, modified by the fact that the same depression results in suction upon the conduit H and thus suction upon the top of the fuel in the float-feed chamber J. The suction through the conduit H therefore operates counter to the jet L as it tends to retain the fuel in the chamber J, whereas the suction on the jet L is operating to withdraw the same, but as the suction is always greater on the jet than on the conduit H fuel will flow through the jet but in quantities modified by the counter-suction through the said conduit H.

Figure 4:
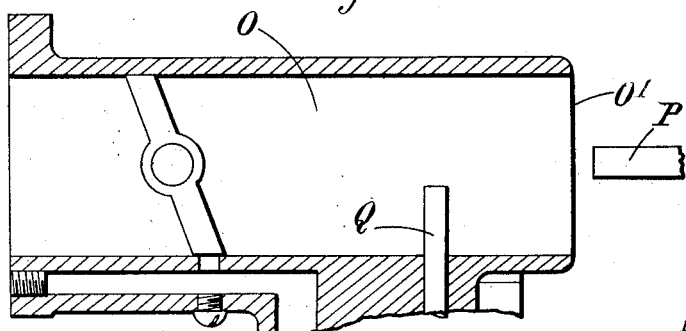
Fig. 4 is a diagrammatic view of a detail.

The modifying effect of the conduit H may be increased or decreased by swinging the conduit so that its free end H² enters further into or is withdrawn further from the choke-tube as indicated by the second position shown in dotted lines in the drawings.

Where the choke-tube has parallel walls as indicated at O, Fig. 4, it may be necessary to situate the additional suction-conduit P just outside the air-admission end O¹ of the choke-tube. It is thus still on the air-admission side of the fuel-jet Q and is, of course, well within the current of air entering the choke-tube, so that depression occurs at the end of the conduit P in the same manner as has been described with reference to those forms in which the end of the conduit enters the choke-tube.

It will be appreciated that the invention is not restricted to any particular form of jet so long as the construction is such that the additional suction-conduit can communicate with the fuel-system at a point between it and the float-feed chamber if the arrangement shown in Fig. 1 is to be adopted, but the well arrangement described therein is found to give good results.

The adjustable additional suction-conduit is found to give good results when its suction end lies between the fuel-admission point and the effective air-inlet but it can if desired be carried in so far as to lie on the other side of the fuel-admission point.

It will be seen that the effect of moving the free end of the additional suction-conduit farther into or out from the end of the induction-conduit, is to vary the degree of suction operating upon the end of the suction-conduit relatively to that obtaining in the area between it and the point of fuel-admission in the induction-conduit, that is to say, the end of the induction-conduit is moved nearer to or farther from the point of lowest pressure in the induction-conduit by this adjustment. Even if it is moved slightly outside the end of the induction-conduit, it still has its free end in an area where a lower pressure obtains than that of the general external atmosphere.

What I claim as my invention and desire to secure by Letters Patent is:—

In a carbureter, the combination of an induction conduit, means for admitting fuel at a point within said conduit between the exterior end thereof and the engine, and an additional suction conduit constituted by a simple tube open only at its two ends and having one end in communication with the fuel-supply system and the other in operative communication with the effective air-admission end of the induction conduit, which said induction conduit and said suction conduit are arranged to permit of movement of the one relatively to the other for adjusting the extent to which the effective air-admission end of the induction conduit is entered by the end of the additional suction conduit, for the purpose specified.

In testimony whereof I affix my signature.

HERBERT WILLIAM SPILLER.